Sept. 1, 1953  A. I. MURRAY  2,650,501
RELEASE FOR MOTION-PICTURE CAMERA MECHANISM
Filed Nov. 30, 1950
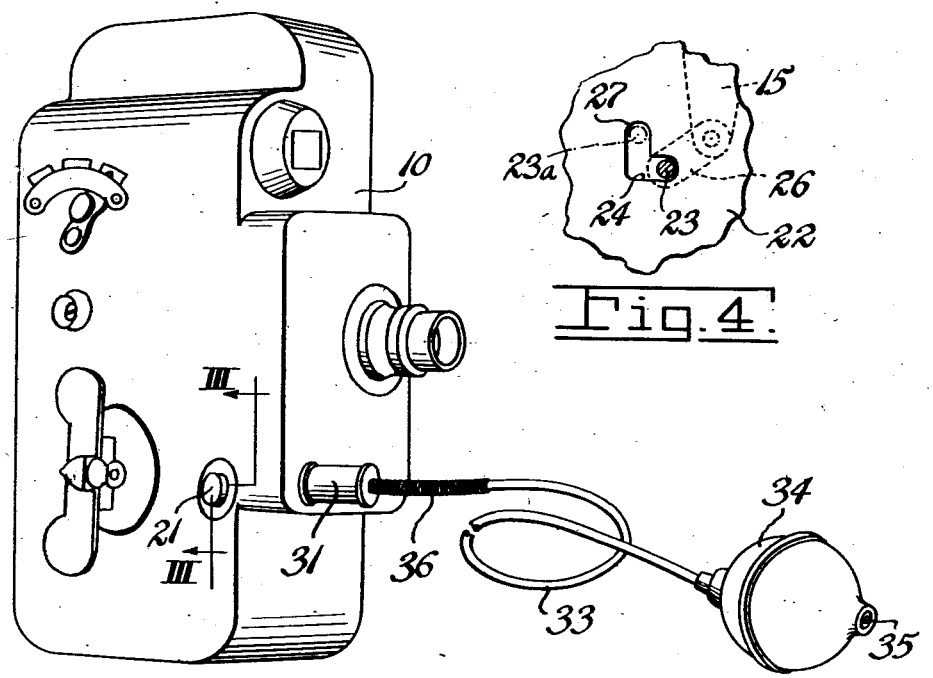
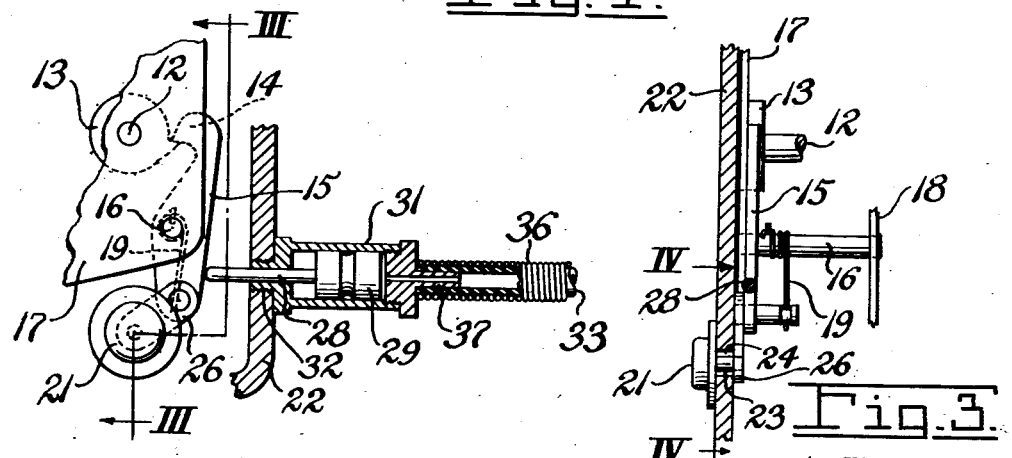
INVENTOR.
ATLA I. MURRAY
BY
Zugelter & Zugelter
Attys.

Patented Sept. 1, 1953

2,650,501

UNITED STATES PATENT OFFICE 2,650,501

RELEASE FOR MOTION-PICTURE CAMERA MECHANISM

Atla I. Murray, Dayton, Ky.

Application November 30, 1950, Serial No. 198,450

1 Claim. (Cl. 74—2)

This invention relates to a control device for a motion picture camera.

An object of this invention is to provide a fluid pressure operated release for the mechanism of the motion picture camera.

A further object of this invention is to provide a motion picture camera having both a manual and a fluid operated release.

A further object of this invention is to provide a motion picture camera of this type having a lock for the manual release which locks the camera mechanism in released position.

The above and other objects and features of the invention will in part be apparent and will in part be obvious from the following detailed description, and the drawing, in which:

Figure 1 is a perspective view showing a motion picture camera having a control device and release constructed in accordance with an embodiment of this invention.

Fig. 2 is a sectional view, partly in side elevation, showing the release mechanism;

Fig. 3 is a view in section taken along a line III—III in Figs. 1 and 2; and

Fig. 4 is a fragmentary view in section taken along a line IV—IV in Fig. 3.

In the following detailed description, and the drawing, like reference characters indicate like parts.

In Fig. 1, a motion picture camera 10 is shown which has controls embodying this invention. The camera includes a conventional film advancing mechanism and shutter, not shown in detail. A shaft 12 (Fig. 3) is in the driving mechanism of the camera and may be connected to the film advancing mechanism and shutter by appropriate gear chains, not shown.

Shaft 12 carries a ratchet wheel 13 (Figs. 2 and 3) which turns with shaft 12. When ratchet wheel 13 and shaft 12 are arrested, the mechanism of the camera is stopped. The ratchet wheel may be arrested by a hook 14, which is at the upper end of a pivotally mounted lever 15. The hook is adapted to engage and arrest the ratchet to stop the camera mechanism. Lever 15 is pivotally mounted on a stationary shaft 16. Shaft 16 extends between and is attached to spaced plates 17 and 18 which form supports for the camera mechanism. A coil spring 19 wound on shaft 16 urges the hook into engagement with the ratchet so that the mechanism of the camera is normally stopped except when the hook is swung away from the ratchet against the force of spring 19.

Hook 14 and lever 15, which carries the hook, can be swung back manually by means of a button 21. Button 21 is on the outside of the casing 22 of the camera. Button 21 is mounted on a stem 23 which extends through a slot 24 in the casing. The stem is connected to the lower end of the lever by a link 26 so that when the button is pushed toward the back of the camera, the hook is swung out of engagement with the ratchet wheel to release the camera mechanism. Slot 24 is of L-shape, as shown in Fig. 4, so that the camera releasing mechanism can be locked in released position by advancing the button through an angular path to set the stem in a vertical portion 27 of the slot, as indicated in dot-dash lines at 23a in Fig. 4.

The hook can also be swung out of engagement with the ratchet by means of a fluid pressure operated plunger 28. As shown in Fig. 2, the plunger engages the lower end of lever 15, and, when the plunger is driven to the left as shown in Fig. 2, lever 15 is swung clockwise to release the ratchet wheel. Plunger 28 is attached to a piston 29 which reciprocates inside a cylinder 31. Cylinder 31 is attached to the casing of the camera opposite the lower end of lever 15 by means of a threaded sleeve 32 at one end of the cylinder. Sleeve 32 surrounds the plunger, so that the plunger reciprocates inside the sleeve.

The piston head end of cylinder 31 is connected to an end of a flexible tube 33. Tube 33 carries a collapsible bulb 34 having a check valve 35 at its outer end. When bulb 34 is squeezed, air pressure is applied through tube 33 to the piston head end of the cylinder to drive the piston and plunger to the left, as shown in Fig. 2, and release the camera stopping mechanism. The portion of tube 33 adjacent cylinder 31 is surrounded by a coil spring 36 which protects the end of the rubber tube and prevents excessive bending thereof.

The rubber tube and aspirator bulb may readily be removed from the camera when not required by slipping the end of the rubber tube off a metal tube 37 which is integral with the cylinder and communicates with the piston head end of the cylinder. When the cylinder is in place, the camera can be operated from a distance by pressure on the aspirator bulb, and if desired, the camera can be set up on a tripod and the operator may get in the field of the camera before pressing the bulb so that the operator can take a picture of himself.

The camera control device illustrated in the drawing and described above is subject to structural modification without departing from the spirit and scope of the invention.

Having described my invention, what I claim as new and desire to secure by Letters Patent is:

A control device for a motion picture camera which comprises a ratchet wheel for controlling the camera mechanism, a pivotally mounted hook engageable with the ratchet wheel to stop the mechanism, a hollow, cylindrical housing open at both ends, said housing having on the inside thereof a flange at one end thereof, a lug integral with said flange and projecting axially therefrom, means for attaching said cylinder to the camera with the lug projecting through the casing of the camera, said lug and said flange having an axial opening therethrough, a piston in said cylinder, a plunger carried by said piston and projecting through the opening in the lug and flange into engagement with the hook, a plug closing the other end of said cylinder, said plug having an opening therethrough, a fluid pressure tube attached to said plug in communication with the opening therein, and means for applying fluid pressure to said tube to cause the piston to advance toward the lug end of the cylinder and drive the plunger therethrough, whereby the hook is swung out of engagement with the ratchet wheel when fluid pressure is applied to the tube to cause release of the ratchet wheel.

ATLA I. MURRAY.

References Cited in the file of this patent

UNITED STATES PATENTS

| Number | Name | Date |
|---|---|---|
| 1,354,999 | Pieri | Oct. 5, 1920 |
| 1,752,503 | Partlow | Apr. 1, 1930 |
| 1,866,588 | Warren | July 12, 1932 |
| 1,973,937 | Tracy | Sept. 18, 1934 |
| 2,203,626 | Grant, Jr. | June 4, 1940 |
| 2,229,816 | Nicastro | Jan. 28, 1941 |
| 2,295,853 | Levy | Sept. 15, 1942 |
| 2,402,343 | Price | June 18, 1946 |

FOREIGN PATENTS

| Number | Country | Date |
|---|---|---|
| 115,545 | Switzerland | July 1, 1926 |